A. PONTEN.
ANTIFRICTIONAL BEARING.
APPLICATION FILED JAN. 10, 1908.
954,464.
Patented Apr. 12, 1910.
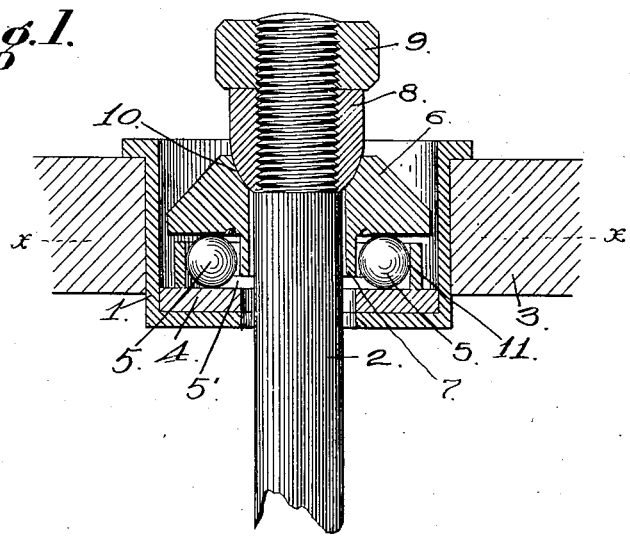
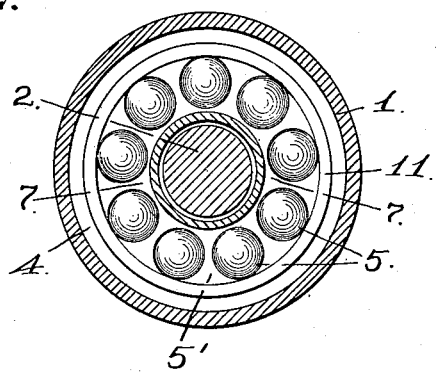
WITNESSES.
INVENTOR.

UNITED STATES PATENT OFFICE.

ANDERS PONTEN, OF BERKELEY, CALIFORNIA, ASSIGNOR OF ONE-HALF TO AXEL JOHNSON, OF OAKLAND, CALIFORNIA.

ANTIFRICTIONAL BEARING.

954,464.   Specification of Letters Patent.   Patented Apr. 12, 1910.

Application filed January 10, 1908. Serial No. 410,102.

*To all whom it may concern:*

Be it known that I, ANDERS PONTEN, a citizen of the United States, residing at Berkeley, in the county of Alameda and State of California, have invented certain new and useful Improvements in Antifrictional Bearings, of which the following is a specification.

The invention relates to that class of bearings known as anti-frictional bearings, and more particularly to a ball bearing for use in connection with vertical shafts or spindles, the main object of which is to reduce friction of the shaft bearing to a minimum, while at the same time permitting free movement of the shaft, also to simplify the construction of such bearings, and to provide means for compensating for the friction which ordinarily exists between the bearing balls and the outer wall of the race-way in which the same are propelled.

To comprehend the invention reference should be had to the accompanying sheet of drawings, wherein—

Figure 1 is a detail sectional view of the bearing, illustrating the application thereof to a vertical shaft or spindle. Fig. 2 is a sectional plan view of the bearing, taken on line $x$—$x$ of Fig. 1 of the drawings.

In the drawings, the numeral 1 is used to designate an outer cup or casing for the bearing, which cup or casing is provided with a central aperture through which extends the vertical shaft or spindle 2. The said cup or casing is secured in any suitable manner to a stationary structure 3, and within the bottom portion thereof is fitted a bearing-ring 4. On this bearing-ring are propelled and travel the bearing balls 5, which balls are held within the race-way 5' by means of the hub 6. The said hub is provided with a downwardly extending cylindrical wall 7, which not only serves as a guide extension for the shaft or spindle 2 extended through the central bore of the hub 6, but as an inner retaining wall for the bearing balls 5. The hub 6 is held down onto the upper surface of the bearing balls 5, by means of the adjusting collar 8, which collar screws onto the upper reduced screw-threaded end of the shaft or spindle 2, and is held thereon by the lock nut 9. The lower end portion of the securing or adjusting collar 8 is slightly rounded, and rests within the socket seat 10 in the upper face of the hub 6, thus providing a ball and socket joint between the said parts. The joint so formed permits of the shaft or spindle 2 swinging slightly during its rotary movement, the central aperture or bore through the cup or casing 1, and of the hub 6 being of a diameter somewhat greater than that of the said shaft or spindle 2 to allow for such swinging action or gyratory motion of the same.

Ordinarily, the bearing balls are forced when driven at a high speed against the outer wall of the race-way, which is the occasion of considerable friction. In the present case, such friction is eliminated by means of the bearing ring 11, which is loosely fitted within the cup or casing 1, said ring serving as a confining or retaining wall for the bearing balls 5. When the shaft or spindle has rotation imparted thereto, the bearing balls are thrown outwardly, being driven or propelled within the race-way 5' by the pressure of the hub 6 thereon, which hub also holds the bearing ring 11 within the cup or casing 1. As the bearing balls 5 are thrown outwardly, they bear onto the inner surface of the bearing or retaining ring 11, and cause the said ring to rotate therewith, thus relieving the friction which otherwise would exist by reason of the bearing balls acting against a fixed or stationary wall. Inasmuch as there exists only points of contact between the bearing balls and the hub 6 and the bearing-ring 4, and a rotatable retaining ring, the friction between the several parts of the bearing is reduced to a minimum.

The described bearing will be found by reason of its extreme sensitiveness to be especially applicable for use in connection with suspended shafts, although it is equally as well adapted for vertically disposed shafts and spindles generally.

Having thus described the invention, what is claimed as new and desired to be protected by Letters Patent is—

1. A bearing of the described character, the same comprising an outer stationary casing, a bearing hub having an integral depending cylindrical wall rotatably held within the said outer casing, a series of bearing balls arranged within a circular race-way formed between the bearing hub and the casing, said depending circular wall constituting the inner wall of said race-way, and a retaining bearing ring for the balls loosely held within the said casing, the said ring being driven by the rotation of the bearing balls.

2. A bearing of the described character in combination with a vertical shaft, said bearing comprising an outer stationary casing through which the shaft extends, a bearing hub having a depending cylindrical wall rotatably held within the outer casing, said hub fitting loosely on the shaft, a series of bearing balls arranged within the circular race-way formed between the bearing hub and the said casing a bearing ring on which the bearing balls travel, a retaining ring for the bearing balls loosely held within the said outer casing, an adjusting collar on the shaft for the holding of the bearing hub in position, there being a ball and socket joint connection between the said collar and the hub for permitting of the shaft swinging during its rotary movement.

3. A bearing for a vertical shaft comprising an annular bearing ring, a support therefor, a bearing hub, a series of bearing balls arranged below the under surface of the hub and resting upon said bearing ring, the hub having a cylindrical wall projecting downwardly to a point adjacent said bearing ring to constitute an elongated bearing for the shaft and the inner retaining wall for the bearing balls, and a bearing ring upon the opposite side of said bearing balls constituting the other retaining wall for the balls and being loosely mounted on the first mentioned annular bearing ring for relative lateral movement.

4. A bearing of the described character and in combination with a vertical shaft, an outer stationary casing through which the shaft extends, a bearing hub having a depending circular wall rotatably held within the outer casing, said hub fitting loosely on the shaft, a series of bearing balls arranged within the circular race-way formed between the bearing hub and the said casing, a bearing ring on which the bearing balls travel, a retaining ring for the bearing balls loosely held within the said outer casing, and a ball and socket connection between the said collar and the hub for permitting of the shaft swinging during its rotary movement.

In testimony whereof I have signed my name to this specification in the presence of two subscribing witnesses.

ANDERS PONTEN.

Witnesses:
N. A. ACKER,
AXEL JOHNSON.